United States Patent [19]

Shinonaga et al.

[11] Patent Number: 4,933,751
[45] Date of Patent: Jun. 12, 1990

[54] TRI-COLOR SEPARATING OPTICAL SYSTEM

[75] Inventors: Hirohiko Shinonaga, Yokohama; Itsuo Takanashi, Kamakura; Shintaro Nakagaki, Fujisawa; Tsutou Asakura, Yokohama; Masato Furuya, Yokosuka, all of Japan

[73] Assignee: Victor Company of Japan, Ltd., Yokohama, Japan

[21] Appl. No.: 241,745

[22] Filed: Sep. 8, 1988

[30] Foreign Application Priority Data

Sep. 9, 1987 [JP] Japan .................................. 62-226137

[51] Int. Cl.$^5$ ............................................. H04N 9/04
[52] U.S. Cl. ........................................ 358/55; 358/41; 358/75; 350/173
[58] Field of Search ...................... 358/41, 43, 44, 49, 358/75; 350/169, 171, 173, 55

[56] References Cited

U.S. PATENT DOCUMENTS

| | | | |
|---|---|---|---|
| 4,068,261 | 1/1978 | Yoshizaki | 358/55 |
| 4,191,456 | 3/1980 | Hong et al. | 358/61 |
| 4,281,339 | 7/1981 | Morishita et al. | 358/43 |
| 4,395,108 | 7/1983 | Morse | 358/75 |

FOREIGN PATENT DOCUMENTS 0279647 8/1988 European Pat. Off. .
1140270 2/1985 U.S.S.R. .................................. 358/49

Primary Examiner—Howard W. Britton
Assistant Examiner—Kim Yen Vu
Attorney, Agent, or Firm—Fleit, Jacobson, Cohn, Price, Holman & Stern

[57] ABSTRACT

To form three different color optical images in close vicinity to each other on the same image forming plane in a tri-color separating optical system, the optical system comprising a lens for focusing a subject optical image on a green optical image forming plane ($I_g$); dichroic mirrors or a dichroic prism for directly passing a green color image and reflecting a blue color image in the first direction and a red color image in the second direction; a first prism having therein a total reflection surface and an extended optical path length for reflecting the blue color image to a blue optical image-forming plane ($I_b$); and a second prism having therein a total reflection surface and an extended optical path length for reflecting the red color image to a red optical image-forming plane ($I_r$).

8 Claims, 2 Drawing Sheets

UNIT: m/m

TRI-COLOR SEPARATING OPTICAL SYSTEM

BACKGROUND OF THE INVENTION

1. Field of the Art

The present invention relates to a tri-color separating optical system incorporated in various color image pickup apparatus of high resolution.

2. Prior Art

Video signals representative of an optical image of a subject can be obtained through a color image pickup apparatus, and have various advantages such as the signal processing (e.g. editing, trimming, etc.) and the signal recording/reproducing processing being facilitated by use of an erasable recording medium. In the color image pickup apparatus for generating video signals, an optical image of a subject obtained through an image pickup lens system is separated into three primary colors through a color separating optical system and then focused onto a photoelectric transducer composed of image pickup elements in order to generate electrical image information signals corresponding to the optical image of a subject. The generated image information signals are output in time sequence as video signals. As is well known, various image tubes or various solid state image sensing elements are used as the image pickup elements incorporated into the color image pickup apparatus.

On the other hand, a multi-layer color film is used to record color optical images of a subject.

In passing, it must be mentioned that, recently, various novel television systems (i.e. EDTV/extended frequency range TV, HDTV/high definition TV) have been proposed along with the increasing demand for higher quality and higher resolution reproduced picture. To improve the quality of the reproduced picture, a color image pickup apparatus which can generate video signals of higher picture quality and higher resolution are now required. In the case of color image pickup apparatus using an image tube as the image pickup element however, it is difficult to generate video signals which can reproduce picture images of higher quality and higher resolution. This is because there exists a limit to minimizing the diameter of the electron beam in the image tube. Furthermore, since the target capacitance of the image tube increases with increasing target area, it is impossible to improve the resolution by enlarging the target area. Furthermore, in case of taking moving pictures, the frequency band of video signals is demanded to range from several tens to several hundreds of megahertz (MHz), thus the S/N ratio deteriorates as the resolution of the moving pictures increases.

This can be explained in more detail by saying that two means of generating video signals which can reproduce high-quality and high-resolution pictures by a color image pickup apparatus using an image tube as an image pickup elements, are by decreasing the electron beam diameter of the image tube or by enlarging its target area. However, it is impossible to reduce the electron beam diameter below a certain limit determined by the performance of an electron gun and the structure of the focusing system. Furthermore, when the target area is enlarged by using a large diameter image lens in order to improve the resolution, since the high frequency signal components of output signals of the image tube have a reduced voltage level due to an increase in the garget capacitance, the S/N ratio of the image tube output signals deteriorates markedly. In summary, in the prior art color image pickup apparatus using an image tube, it has been impossible to generate video signals which can reproduce high-quality and high-resolution pictures.

Furthermore, in the case of color image pickup apparatus using solid state image pickup elements, although (pixels) it is required to increase the number of picture elements in order to reproduce high quality and high resolution pictures, there exist other problems in that the frequency of the clock for driving the picture elements increases to as high as 500 to 600 MHz in the case of moving picture cameras and also that the electrostatic capacitance of the driver circuits increases with an increasing number of picture elements. At present, since the upper limit of the frequency of the clock for driving solid state image pickup elements is about 20 MHz, it is therefore impossible to construct a practical apparatus.

To overcome the above-mentioned problems, that is, to generate video signals which can reproduce high-quality and high-resolution pictures, the same applicant has already filed a Patent Application (U.S. Ser. No. 139,005 now U.S. Pat. No. 4,831,452) entitled "Color image pickup apparatus", in which one of the proposed systems comprises means for separating an optical image of a subject obtained through an image lens into two or more optical images different in at least the wavelength range; means for forming each separated optical image at respective light-to-light converting element; and means for reprojecting the optical image information corresponding to optical images of a subject formed on said single light-to-light converting element, onto erasable recording medium, i.e. rewritable recording medium, in the form of optical image information signals on said erasable recording medium in time sequence. In the above-mentioned color image pickup apparatus, since video signals that can reproduce high-resolution pictures can easily be obtained from such reversible namely rewritable recording medium on which optical image information is recorded, it is possible to solve the aforementioned problems involved in the prior-art apparatus. However, there exists a problem in that the construction of this apparatus is rather complicated since each of two or more optical images with different wavelength ranges obtained by separating an optical image of a subject obtained through an image pickup lens, has to be formed on respective different light-to-light converting elements.

In more detail, with reference to FIG. 1, the prior art tri-color separating optical system comprises a subject O, an image pickup lens L, dichroic mirrors $D_r$, $D_b$, two total reflection mirrors $M_{r1}$ and $M_{b1}$, a red-component optical image-forming plane $I_{r1}$, a blue-component optical image-forming plane $I_{b1}$, and a green-component optical image-forming plane $I_g$. In the prior art tri-color separating optical system shown in FIG. 1 since the three image-forming planes $I_{r1}$, $I_{b1}$ and $I_g$ of three optical images obtained through color separation are spatially separated from each other, it has been necessary to use a special light-to-light converting element for forming a plurality of optical images. As shown in FIG. 1, the spatial offsets of these three image-forming planes $I_{r1}$, $I_{b1}$ and $I_g$ include an axial offset a i.e. a displacement along the light pathes to the image-forming planes, and a transverse offset having a same amount a caused in a direction perpendicular to the light pathes, both offsets are refered to the green-component optical image-forming plane $I_g$. The axial offset is caused by the transverse offset.

There are other proposed systems disclosed in the same Patent Application (U.S. Ser. No. 139,005), in which separated three(3) color images are focused on a single plane, but these systems require either complicated optical arrangement or expensive optical path-length adjusting members, otherwise an orientation of the focused color images would be opposite each other, i.e. one image would be upright but other two images might be upside-down.

Accordingly, when two or more optical images with different wavelength ranges obtained by separating an optical image of a subject obtained through an image pickup lens are recorded on an erasable recording medium, since the image forming planes of optical images obtained through color separation are either spatially separated from each other, or the orientations of optical images of a subject formed or the image-forming planes are different from each other, it is necessary to use a plurality of different erasable recording media to record plural optical images, thus complicating the apparatus structure.

The above-mentioned problem is common to a case where two or more optical images with different wavelength ranges obtained by separating an optical image of a subject obtained through an image pickup lens are recorded on an irreversible (not erasable but writable once) recording medium such as a monochrome film which records each of the separated color images in the effort of preventing discoloration inherent to a multilayer color film.

SUMMARY OF THE INVENTION

With these problems in mind, therefore, it is the primary object of the present invention to provide a tri-color separating optical system by which two or more optical images with different wavelength ranges formed by separating an optical image of a subject obtained through an image pickup lens can be arranged in close vicinity to each other on the same single image forming plane with rather of a simple optical system configuration.

To achieve the above-mentioned object, a tri-color separating optical system for separating an optical image of a subject into three different color optical images, according to the present invention, comprises (a) focusing means for focusing the subject optical image on a first optical image-forming plane; (b) dichroic reflecting means, optically coupled to said focusing means, for directly passing a first color optical image therethrough and reflecting a second color optical image in a first direction therefrom, and a third color optical image in a third direction opposite to the first direction therefrom; (c) first optical block means having therein a first total reflection surface optically coupled to said dichroic reflecting means and a first extended optical path length for reflecting the second color optical image reflected from said dichroic reflecting means in the first direction to a second optical image forming plane through the first extended optical path length; and (d) second optical block means having therein a second total reflection surface optically coupled to said dichroic reflecting means and a second extended optical path length, for reflecting the third color optical image reflected from said dichroic reflecting means in the second direction to a third optical image forming plane through the second extended optical path length, the first, second and third different color optical image-forming planes being aligned with each other in close vicinity on a single plane.

The first or second extended optical path length can be determined on the basis of the optical path length of the block means and the refraction index of the material. The focusing means is an image-pickup convex lens; the dichroic reflecting means is a dichroic mirror or a dichroic prism having a first mirror for reflecting only the blue color optical image and passing through red and green color optical images, and a second dichroic mirror for reflecting only the red color optical image and passing through blue and green color optical images. The first and second optical block means are first and second prisms, each formed with a total reflection surface and an extended optical path length.

Furthermore, according to the present invention, it is possible to provide a color image pickup apparatus by arranging photoelectric transducing elements at the three different color optical image forming planes of the optical system if desired.

BRIEF DESCRIPTION OF THE DRAWINGS

The features and advantages of the tri-color separating optical system according to the present invention will be more clearly appreciated from the following description taken in conjunction with the accompanying drawings in which like reference labels designate corresponding elements and in which.

DETAILED DESCRIPTION OF THE PREFERRED EMBODIMENTS

A tri-color separating optical system according to the present invention will be described hereinbelow in detail with reference to the attached drawings.

Figure 2:
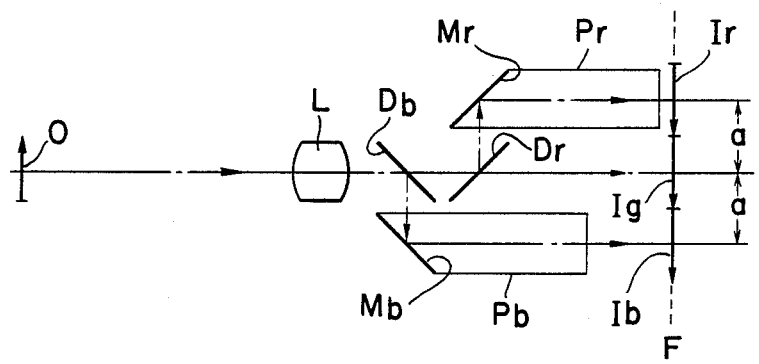
FIG. 2 is a similar diagrammatical view for assistance in explaining a first embodiment of the tri-color separating optical system according to the present invention.

In FIG. 2, the optical system comprises an image pickup lens L (focusing means), a first (blue) prism $P_b$ (optical block) formed with a first total reflection surface $M_b$ and a blue color optical path therein, a second (red) prism $P_r$ (optical block) formed with a second total reflection surface $M_r$ and a red color optical path therein, and a dichroic mirror (dichroic reflecting means) composed of a first (blue) mirror $D_b$ arranged parallel to the first total reflection surface $M_b$, for reflecting only the blue color component but passing through the red and green color cOmponents, and a second (red) mirror $D_r$ arranged parallel to the second total reflection surface $M_r$, for reflecting only the red color component but passing through the blue and green color components.

Furthermore, in FIG. 2, the green color component of an optical image of a subject O travels from the subject O, through the lens L and the dichroic mirrors $D_b$, $D_r$, to a green image-forming plane $I_g$; the blue color component of the optical image of the subject O travels from the subject O, through the lens L, the dichroic mirror $D_b$, the first total reflection surface $M_b$, and the first (blue) prism $P_b$, to a blue image-forming plane $I_b$; and the red color component of the optical image of the subject O travels from the subject O, through the lens L, the dichroic mirrors $D_b$, $D_r$, the second total reflection surface $M_r$, and the second (red) prism $P_r$, to a red image-forming plane $I_r$.

In the present embodiment, the blue component optical subject image is formed on the blue image-forming plane $I_b$ by extending the blue color optical path length within the first (blue) prism $P_b$, while the red component optical subject image is formed on the red image-forming plane $I_r$ by extending the red color optical path length within the second (red) prism $P_r$, so that the two, blue and red, color subject optical images can be formed in close vicinity to each other on the same plane F on which a green color optical image is formed, as depicted in FIG. 2.

The function of these prisms $P_b$ and $P_r$ will be described below.

An extension (displacement caused) x of the optical path length of a beam of light passing through a prism can be expressed as $$x = d(n-1)n \tag{1}$$

where d denotes the optical path length in a prism and n denotes the refraction index of the prism.

Figure 1:
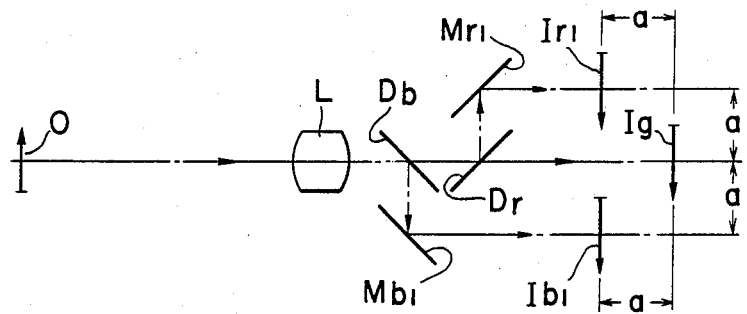
FIG. 1 is a diagrammatical view for assistance in explaining the prior-art tri-color separating optical system incorporated in a color image pickup apparatus.

As shown in FIG. 1, the axial offset of the red color image is a between the red image-forming plane $I_{r1}$ and the green image-forming plane $I_g$, therefore it is possible to form in FIG. 2 both the red and green images on the same green image forming plane $I_g$ by properly determining the optical path length d within the prism $P_r$ and the refraction index n of the prism $P_r$ so that the axial offset a matches the extension e (i.e. x=a). In the same way, it is possible to form both the blue and green images on the same green image-forming plane by properly determining d and n so that a matches x.

That is, when the two prisms $P_b$ and $P_r$ are formed appropriately, it is possible to form three, red, blue and green, color subject images in close vicinity to each other on the same single image-forming plane without reversing the orientations of three color optical images of a subject and without superimposing the three color optical images on the same image-forming plane.

Furthermore, when a prism with a large refraction index n is used, since the optical path length d within the prism can be reduced in accordance with the formula (1), it is possible to obtain a small-sized tri-color separating optical system.

Figure 3:
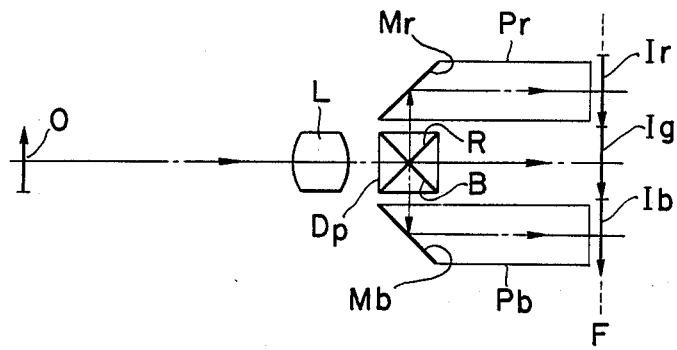
FIG. 3 is a similar diagrammatical view for assistance in explaining a second embodiment of the present invention.

FIG. 3 shows a second embodiment of the present invention, in which a dichroic prism $D_p$ is used instead of the dichroic mirrors $D_b$, $D_r$. This dichroic prism $D_p$ is formed with a red dichroic mirror surface R for reflecting only the red color component and passing through the blue and green components, and a blue dichroic mirror surface B for reflecting only the blue color component but passing through the red and green components. Other than those described above, the structual features and functional effects of this second embodiment are substantially the same as with the first embodiment previously described, and any detailed description thereof is believed unnecessary.

Furthermore, in the first embodiment shown in FIG. 2, it is also possible to use a dichroic prism having a dichroic mirror surface R for reflecting only the red color component and pasing through the blue and green color components in place of the dichroic mirror $D_r$, and a dichroic prism having a dichroic mirror surface B for reflecting only the blue color component and passing through the red and green color components in place of the dichroic mirror $D_b$.

Figure 4:
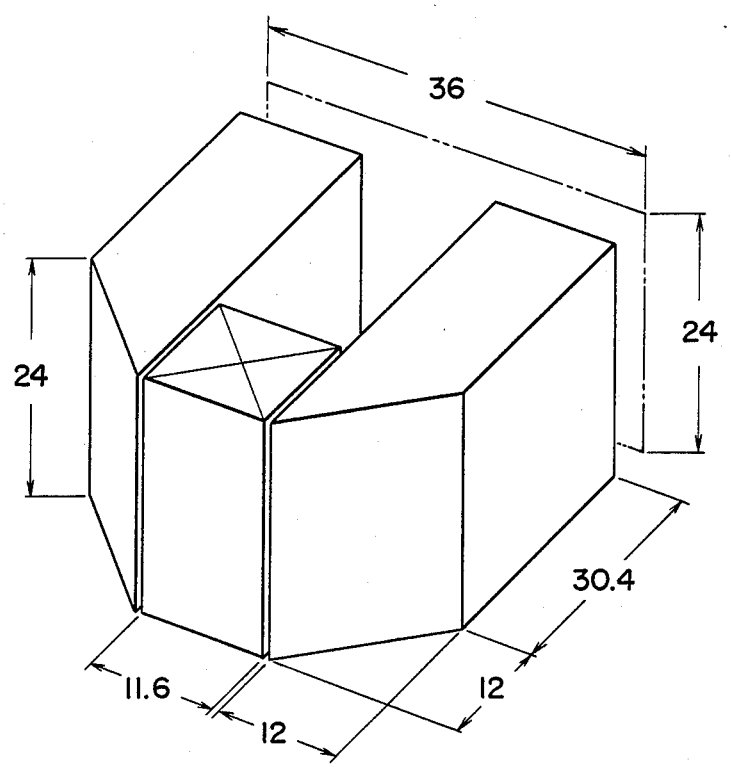
FIG. 4 is a perspective view showing an example of a practical optical system configuration of the second embodiment shown in FIG. 3.

FIG. 4 is a perspective view showing an example of the second embodiment of the optical system according to the present invention, in which dimensions are shown in millimeters. Furthermore, in FIG. 4, an area shown by $3 \times 24$ indicates an effective area corresponding to a 35 mm camera film frame, so that one frame of the 35 mm film records one set of red, green and blue images aligned and oriented in the same direction.

In FIGS. 2 and 3 again, when photoelectric transducing elements are placed at the optical image forming plane F in the tri-color separating optical system, it is possible to configure a color image pickup apparatus such as video camera.

Furthermore, when a positive color printing paper (unexposed) is placed at the position of the subject O, and three negative images are respectively projected from the image forming plane F toward the tri-color separating optical system, it is possible to produce a printed color image on the printing paper. Similarly, when a negative color printing paper (unexposed) is placed at the position of the subject O, and three negative images are respectively projected from the image forming plane F toward the tri-color separating optical system, it is possible to produce a negative printed color image on the negative printing paper of which intensity and color are reversed if observed with the naked eye.

Furthermore, since a multilayer color film is subject to discoloration problem, it is preferable to record three optical images of a subject separated into three different colors on a monochrome film. In this case, however, it is necessary for the records monochrome film being projected with three different lights in order to reproduce a color image therefrom.

Furthermore, even if the subject O has mono color, the tri-color optical system of the present invention can form three optical images at a time on the image forming plane without reversing the orientations thereof.

As described above, in the tri-color separating optical system according to the present invention, since two or more optical images with different wavelength ranges formed by separating an optical image of a subject obtained through an image pickup lens can be formed in close vicinity to each other on the same single plane causing the extensions of the optical path lengths in two prisms, in the same magnification and the same orientation, it is possible to simplify and minimize the tri-color separating optical system. Therefore, when the optical system of the present invention is incorporated in a color image pickup apparatus and a color image is recorded on a monochrome film, to avoid discoloration caused in a multilayer color film, use of this color image pickup apparatus enables the arrangement of the monochrome film to be simplified.

What is claimed is:

1. A tri-color separating optical system for separating an optical image of a subject into three different color optical images, which comprises:
    (a) focusing means for focusing the subject optical image on a first optical image forming plane ($I_g$);
    (b) dichroic reflecting means, optically coupled to said focusing means, for directly passing a first color optical image therethrough and reflecting a second color optical image in a first direction therefrom, and a third color optical image in a second direction opposite to the first direction therefrom;

(c) first optical block means having therein a first total reflection surface optically coupled to said dichroic reflecting means and causing a first extended optical path length, for reflecting the second color optical image reflected from said dichroic reflecting means in the first direction to a second optical image forming plane ($I_b$) through the first extended optical path length; and (d) second optical block means having therein a second total reflection surface optionally coupled to said dichroic reflecting means and causing a second extended optical path length, for reflecting the third color optical image reflected from said dichroic reflecting means in the second direction to a third optical image forming plane ($I_r$) through the second extended optical path length; the first, second and third different-color optical image forming planes ($I_g$, $I_b$, $I_r$) being aligned with each other in close vicinity on a single plane.

2. The tri-color separating optical system of claim 1, wherein the first or second extended optical path length is determined in accordance with the formula as $$x = d(n-1)n$$

where x denotes an extended amount of optical path length; d denotes an optical path length of said first or second optical block means; and n denotes a refraction index of material of said optical block means.

3. The tri-color separating optical system of claim 1, wherein said focusing means is an image pickup convex lens.

4. The tri-color separating optical system of claim 1, wherein said dichroic reflecting means is a dichroic mirror composed of a first mirror for reflecting only the blue color optical image and passing through the red and green color optical images and a second mirror for reflecting only the red color optical image and passing through the blue and green color optical images.

5. The tri-color separating optical system of claim 1, wherein said dichroic reflecting means is a dichroic prism having a first dichroic mirror surface for reflecting only the blue color optical image and passing through the red and green color optical images and a second dichroic mirror surface for reflecting only the red color optical image and passing through blue and green color optical images.

6. The tri-color separating optical system of claim 1, wherein said first and second optical block means are first and second prisms each formed with a total reflection surface and an extended optical path length, respectively.

7. A color image pickup apparatus, comprising:
(a) a tri-color separating optical system for separating an optical image of a subject into three different color optical images, as recited in claim 1; and
(b) photoelectric transducing elements arranged on the first, second and third different color optical image forming planes, respectively.

8. A tri-color separating optical system for separating an optical image of a subject into three different color optical images, which comprises:

(a) focusing means for focusing the subject optical image on a first optical image forming plane ($I_g$);

(b) dichroic reflecting means, optically coupled to said focusing means, for directly passing a first color optical image therethrough and reflecting a second color optical image in a first direction therefrom, and a third color optical image in a second direction opposite to the first direction therefrom;

(c) first optical block means having therein a first total reflection surface optically coupled to said dichroic reflecting means and causing a first extended optical path length, for reflecting the second color optical image reflected from said dichroic reflecting means in the first direction to a second optical image forming plane ($I_b$) through the first extended optical path length; and (d) second optical block means having therein a second total reflection surface optically coupled to said dichroic reflecting means and causing a second extended optical path length, for reflecting the third color optical image reflected from said dichroic reflecting means in the second direction to a third optical image forming plane ($I_r$) through the second extended optical path length; the first, second and third different-color optical image forming planes ($I_g$, $I_b$, $I_r$) being aligned with each other in close vicinity on a single plane, wherein: the first or second extended optical path length is determined in accordance with a formula as $$x = d(n-1)n$$

where x denotes an extended amount of optical path length; d denotes an optical path length of said first or second optical block means; and n denotes a refraction index of material of said optical block means.

* * * * *